UNITED STATES PATENT OFFICE.

FANNY O. MARQUIS, OF NEW YORK, N. Y.

FOOD COMPOSITION.

1,279,390.

Specification of Letters Patent. Patented Sept. 17, 1918.

No Drawing. Application filed December 7, 1917. Serial No. 205,940.

*To all whom it may concern:*

Be it known that I, FANNY O. MARQUIS, a citizen of the United States, residing at the city of New York, in the borough of Manhattan and State of New York, have invented certain new and useful Improvements in Food Compositions, of which the following is a full, clear, and exact description.

The primary object of the invention is to provide a cooked food product which is palatable and easily digestible and yet contains the different ingredients which are necessary to properly sustain and nourish the human system. My aim is to combine in a single easily digestible cooked product the different foods which are ordinarily taken or required at a single meal, to constitute what is generally referred to as a balanced meal or ration. These different foods or substances include meat, grain or cereal in the form of wheat or rye flour, corn meal and the like, fat in different forms and vegetables, fruits, nuts and the like.

The specific purpose of the invention is to produce a cooked product which will contain a large percentage of fat, as well as the other necessary ingredients, and to provide a portion of this fat in a form in which it will not only be readily digested, *per se*, but will also aid in producing a loaf which is of a light and spongy structure, and is both palatable and easily digested. As is well known, if fat is utilized in the form of lard, butter, olive oil or the like,— that is, free fat,—the quantity which can be utilized in conjunction with other substances is necessarily limited because the fat will desseminate through the mixture and cause the resultant product to be soggy and greasy, and therefore indigestible.

According to the present invention, a portion of the fat is supplied to the product in the form of olives,—preferably ripe olives,— and in practice the olives, meat, meal, and other substances which are to be incorporated into the loaf are first reduced to comminuted form and are then thoroughly mixed and cooked. The olive is composed largely of olive oil which is incased within the cells of the pulp or tissue and the latter is of a spongy structure. When the olives and the other ingredients in comminuted form are mixed and the mixture is cooked, the cellular structure of the olive does not appear to break down under the action of the heat, and the olive oil contained within the cells is thus not desseminated through the mixture. By the use of olives, therefore, it is possible to obtain a larger percentage of fat in the cooked product than would be possible if the fat were supplied as free fat, such as lard, butter, olive oil, and the like.

The pulp of the olives also has an important function when the olives and the other ingredients are reduced to comminuted form and thoroughly mixed. Due to the spongy or cellular structure of the pulp, the particles of the olive when thoroughly intermingled with the heavier particles of the meat and other ingredients used, physically separate the denser or heavier particles so that the cooked loaf is light and porous, and hence decidedly lighter and more digestible. The small quantity of the olive oil released from the cells which are cut or broken open in reducing the olive to comminuted form, benefits rather than hurts the product for the reason that the free fat which is thus obtained will serve as a shortening.

One specific formula or recipe from which a cooked product may be prepared in accordance with the invention is as follows:

8 ounces of lean meat,
4 ounces of nuts,
4 ounces of corn meal,
2 ounces of ripe olives,
2 ounces of dried fruits,
⅓ ounce of grated chocolate,
2 ounces of molasses,
1 egg,
1 teaspoonful of baking powder,
6 ounces of water or milk.

The corn meal, chocolate, baking powder and salt may be mixed together in a bowl, in the usual manner. The meat, which is preferably lean so that it contains very little free fat, is chopped or minced, as are also the nuts, fruit and olives, and these ingredients are then thoroughly mixed with the corn meal, chocolate, baking powder, etc. The egg is beaten and mixed with the water or milk and molasses. The fluid mixture is poured into the dry mixture and the entire mass is stirred thoroughly until completely mixed. The final mixture is then placed in a greased baking pan and baked until well done,—say for an hour. A moderately heated oven is used.

The resultant cooked product obtained by following the formula and directions above set forth, is extremely palatable and easily digestible, the same containing very little free grease and being light and porous, similar to a loaf of cake or bread.

It is to be understood that the specific ingredients in their respective proportions, as above set forth, are given only by way of example. Various other combinations with chopped olives may be used. The lean meat used may be either fresh, smoked or salted, and rye, wheat or other kind of flour may be utilized instead of corn meal. The dried fruit, nuts, etc., may be omitted if desired and other foods substituted in place thereof.

I claim:

1. A cooked food loaf containing olives commingled and cooked with the other ingredients of the loaf.

2. A cooked food loaf containing olives in comminuted form commingled and cooked with the other ingredients of the loaf.

3. A cooked food loaf containing meat, meal and olives.

4. A cooked food loaf containing meat, meal and olives in comminuted form.

5. A cooked food loaf containing meat, meal and comminuted ripe olives.

In witness whereof I subscribe my signature.

FANNY O. MARQUIS.